(12) United States Patent  
DeLong

(10) Patent No.: US 6,925,951 B1  
(45) Date of Patent: Aug. 9, 2005

(54) BOAT DOCKING ROPE CUFFS

(76) Inventor: Mark DeLong, 8509 Hidden Meadow, Fort Worth, TX (US) 76179

( * ) Notice: Subject to any disclaimer, the term of this patent is extended or adjusted under 35 U.S.C. 154(b) by 0 days.

(21) Appl. No.: 10/775,541

(22) Filed: Feb. 9, 2004

(51) Int. Cl.$^7$ ............................................. B63B 21/04
(52) U.S. Cl. ................................... 114/218; 24/132 R
(58) Field of Search ........................... 114/218, 230.26; 24/129 R, 132 R, 129 A, 299

(56) References Cited

U.S. PATENT DOCUMENTS

| | | | |
|---|---|---|---|
| 904,843 A | * | 11/1908 | Cooper ...................... 24/129 R |
| 1,392,816 A | | 10/1921 | Crocker |
| 1,713,106 A | * | 5/1929 | Ulfers ...................... 24/129 R |
| 2,607,094 A | | 12/1952 | Nicosia |
| D209,619 S | | 1/1967 | Reay |
| 3,540,083 A | | 4/1969 | O'Connor |
| 4,200,053 A | | 4/1980 | Vall |
| 4,694,666 A | | 9/1987 | Bellingham et al. |
| 4,912,816 A | | 4/1990 | Brandt |
| 5,138,852 A | | 8/1992 | Corcoran |
| 5,245,730 A | | 9/1993 | Martin |
| 5,398,383 A | | 3/1995 | Bingold |
| 5,488,844 A | | 2/1996 | Winner |
| 5,799,514 A | | 9/1998 | Tobin, Jr. et al. |
| 5,921,115 A | | 7/1999 | Winner |
| 6,257,163 B1 | | 7/2001 | Carpenter |
| 6,390,009 B2 | | 5/2002 | Brown et al. |
| 6,672,116 B1 | | 1/2004 | Hilliard |

* cited by examiner

*Primary Examiner*—Lars A. Olson  
(74) *Attorney, Agent, or Firm*—Greenlee Winner and Sullivan, PC

(57) ABSTRACT

A rope-fastening device used in docking a boat or other watercraft. The device comprises two adjustable locking rings, both of which can close around a rope or mooring line. Each locking ring has a plurality of gripping members on the inner surface to prevent the rope or mooring line from slipping through the locking ring.

17 Claims, 3 Drawing Sheets

PRIOR ART

BOAT DOCKING ROPE CUFFS

BACKGROUND OF THE INVENTION

When docking a boat or other type of watercraft, it is important to properly secure the boat so that it does not drift into the side or rear of the dock. Boats and other watercraft are secured to a dock through the use of ropes or lines, generally referred to as mooring. Typically, one end of a rope is tied to a cleat on the boat and the other end is wrapped several times around a mooring post on the dock and tied off. The knots used for docking a boat require time to tie properly, especially when more than one line is used, and are difficult for an unskilled person to tie and untie. A secure line is imperative to prevent boat damage or loss.

In an effort to eliminate or reduce the need for skilled tying and untying of knots, several devices have been proposed in the past. For example, U.S. Pat. No. 3,540,083 discloses a mooring cable with a throat block attached on the cable. The end of the mooring cable can be wrapped around a mooring post and locked into the throat block, forming a loop around the mooring post. The end of the cable can be quickly released from the throat block by pulling on a pin.

U.S. Pat. No. 4,200,053 discloses a mooring cinch. A rope having a looped end is placed through the hole in the mooring cinch. When the looped end of a rope is placed over a cleat, the cinch is positioned along the loop and tightened with means such as a wing nut. The tightening of the mooring cinch prevents the loop from slipping off the cleat.

U.S. Pat. No. 4,912,816 discloses a tube with an internal bore able to hold two sections of a rope loop. When the rope loop is passed through the tube, the size of the loop can be easily adjusted by sliding the tube along the rope. The rope loop is placed over a mooring post and the tube adjusted to tighten the loop around the mooring post.

U.S. Pat. App. Pub. 2001/0032576 A1 discloses an adjustable mooring line that has an elastic component for absorbing shock. The ends of the mooring line can be wrapped around a mooring post to form a loop which is adjustable through the use of buckles, straps and fastening clips.

The disadvantages with these devices are that they either require the use of a complicated device or cannot be used with different mooring lines. What is needed is a simple and portable device suitable for use on a wide variety of ropes and mooring lines that can be used to securely fix one end of a rope or mooring line to a mooring post without the use of complicated and time-consuming knots. It is also beneficial that such a device quickly release the mooring lines when leaving the dock.

SUMMARY OF THE INVENTION

The present invention relates to a novel line fastener, also referred to herein as a "rope-fastening device", used for securing a rope or mooring line to a mooring post or other docking object. In a typical use of the present invention, a mooring line is looped around a mooring post and the device is used to fasten the mooring line to itself at the point where the mooring line loops around the mooring post, thereby maintaining the loop without the need for knots. When leaving the dock, the device is quickly released and the mooring line is unwrapped from around the mooring post. As used herein, "docking" includes the act of securing a watercraft to a dock and the act of releasing the watercraft from the dock when leaving.

As used herein, a mooring line is a rope, strap, cord or any other type of line used to tie a boat to a docking object. A docking object is an item on a dock, such as a post, rail or cleat, used in mooring a watercraft. When docking a boat or watercraft, the first end of a mooring line is attached to the watercraft. (Typically a mooring line is sold with a loop on one end, which is attached to a cleat on the watercraft.) The opposite end of the mooring line is wrapped around the docking object. The end of the mooring line which is wrapped around the docking object is herein referred to as the "docking end" of the mooring line. The docking end of the mooring line, which would normally be used to tie a knot to secure the loop around the docking object, is herein referred to as the "free end" of the mooring line. The free end is also known in nautical terms as the bitter end. The main length of the mooring line is known as the standing part.

The rope-fastening device of the present invention comprises: (a) a first and a second locking ring, each locking ring comprising a base; a stationary arcuate arm extending from said base, said stationary arcuate arm having a locking end and a pivot end; a moveable arcuate arm having a locking end and a pivot end connected to the pivot end of said stationary arm at a pivot point; an opening in the locking end of said stationary arm suitable for receiving the locking end of the moveable arm; and a plurality of gripping members along the inner surface of said moveable arm or said stationary arm; and (b) a flexible connector linking the base of said first locking ring with the base of said second locking ring.

The flexible connector connecting the locking rings can be any flexible material, such as a cable or chain, having the tensile strength equal to or greater than rope. The pivot end of the moveable arm is attached to the pivot end of the stationary arm at a pivot point, wherein the moveable arm can rotate around the pivot point. The moveable arm can rotate around the pivot point so that the locking end of the moveable arm is inserted into the opening in the locking end of the stationary arm. This is referred herein as the "closed position".

In one embodiment, the pivot point is a riveted pin through both the pivot end of the stationary arm and the pivot end of the moveable arm allowing the moveable arm to rotate around the pin. In another embodiment, the pivot point is one or more hinges connecting the pivot end of the stationary arm with the pivot end of the moveable arm.

The inner surfaces of the moveable arm and/or the stationary arm have a plurality of gripping members. The term "gripping members" refers to features or surfaces that impede or prevent a rope from sliding past the area having the gripping members. Suitable gripping members include, but are not limited to, ridges, hooks, spikes, barbs or teeth. Additionally, gripping members may include surfaces having increased friction compared to the surrounding surface of the moveable and/or stationary arm. In the closed position, the stationary arm and the moveable arm form a complete ring, roughly circular or elliptical in shape. A mooring line is threaded through the ring, or, alternatively, the ring is opened and then closed around the mooring line. While in the closed position, the gripping members along the inner surfaces of the stationary and moveable arms close tightly around the mooring line and prevent the mooring line from slipping through the ring.

When referring to the stationary arcuate arm and the moveable arcuate arm, the "inner surface" refers to the concave surface of the arm that forms the inner surface of the ring when in a closed position. The "outer surface" refers to the convex surface of the arm that forms the outer surface of the ring when in a closed position.

The size of the ring formed by the stationary arm and moveable arm in the closed position is adjusted by rotating the moveable arm further toward or away from the stationary arm. By adjusting the size of the ring, the device can tightly close around mooring lines of varying sizes. In one embodiment, the device tightly closes around a mooring line having a minimum diameter of ¼ inches. In one embodiment, the device tightly closes around a mooring line having a maximum diameter of two inches. As used herein, "tightly closing" or "suitable for tightly closing" means the device closes around a mooring line so that the mooring line is unable to slide through the ring. A pawl-and-ratchet mechanism maintains the size of the ring formed by the two arms by preventing the moveable arm from rotating away from the locking end of the stationary arm.

The pawl-and-ratchet mechanism comprises a pawl disposed in the locking end of either the stationary arm or the moveable arm. The locking end of the other arm contains a serrated section comprising teeth, ridges, ribs, grooves, slots or notches. The pawl is capable of engaging with the serrated section when the moveable arm is inserted through the opening in the locking end of the stationary arm. Pawl-and-ratchet mechanisms capable for use as part of this invention have been previously described as part of locks (U.S. Pat. Nos. 5,488,844; and 5,921,115) and restraining devices (U.S. Pat. Nos. 4,694,666; 5,138,852; 5,398,383; 5,799,514; and 6,672,116).

In an embodiment of the present invention, the pawl-and-ratchet mechanism comprises a spring biased pawl disposed in the locking end of the stationary arm. One end of the spring biased pawl is fixed to the inside of the locking end of the stationary arm through a pivot. The free end of the pawl extends into the opening in the locking end of the stationary arm and is adapted to engage the locking end of the moveable arm. The outer surface of the locking end of the moveable arm has a plurality of ratchet teeth, each of which has an inclined leading edge and a straight trailing edge. The "leading edge" of each tooth is the edge closer to the locking end of the moveable arm, and the "trailing edge" is the edge closer to the pivot end of the moveable arm. When the moveable arm is inserted into the locking end of the stationary arm, the free end of the pawl will contact the inclined leading edge of a tooth and can ride over the tooth against its spring bias. The free end of the pawl prevents the moveable arm from being retracted from the opening by contacting the side of the straight edge of the tooth. This same process can occur with the subsequent tooth if the moveable arm is advanced further through the opening.

In one embodiment of the present invention, a lever connected to the pawl disengages the pawl from the moveable arm, so that the free end of the pawl cannot contact the straight edges of the inclined teeth, and allows the moveable arm to be withdrawn. Pressing the lever quickly disconnects the device from the mooring line. In another embodiment, a key release mechanism, as known in the art, comprising a key and keyhole connected to the pawl disengages the pawl from the moveable arm and releases the moveable arm when the key is rotated in said keyhole. In another embodiment, a locking mechanism connected to the ratchet mechanism prevents the lever from releasing the moveable arm if locked by a key. This embodiment allows the user to quickly release the device from a mooring line by pressing the lever without the need for a key except in circumstances where the user wants to lock the device.

The device is constructed of materials strong enough to withstand the strain caused by the back and forth rocking of a watercraft tied to a dock. In an embodiment of the present invention, the device is constructed of materials having a tensile strength equal to or greater than that of the rope. In one embodiment, the device is constructed from materials that are durable in all weather conditions and are durable in water and salt-water environments. Materials useful in the construction of the present device, either alone or in combination with other materials, include, but are not limited to, metal, plastic, rubber and composite materials.

The stationary and moveable arms of the present device may be approximately round in shape or flat. In one embodiment of the present invention, the stationary and moveable arms are flat and thin, i.e., having a thickness of half of an inch or less, and the device is constructed from metal. In this embodiment, the device may resemble a pair of handcuffs having a plurality of spikes or teeth along the inside of the stationary and moveable arms.

In one embodiment, the device of the present invention is used to dock a watercraft to a docking object by securing the first end of a mooring line to the watercraft, wrapping the docking end of the mooring line around the docking object, tightly closing the first locking ring around the free end of the mooring line, and tightly closing the second locking ring around the standard part of the mooring line. The locking rings of the device should be closed around the free end and the standing part of the mooring line near where the mooring line loops around the docking object so as to form a tight loop around the docking object. Leaving the dock comprises releasing a locking ring from the mooring line and un-wrapping the mooring line from around the docking object.

DETAILED DESCRIPTION OF THE INVENTION

Figure 1:
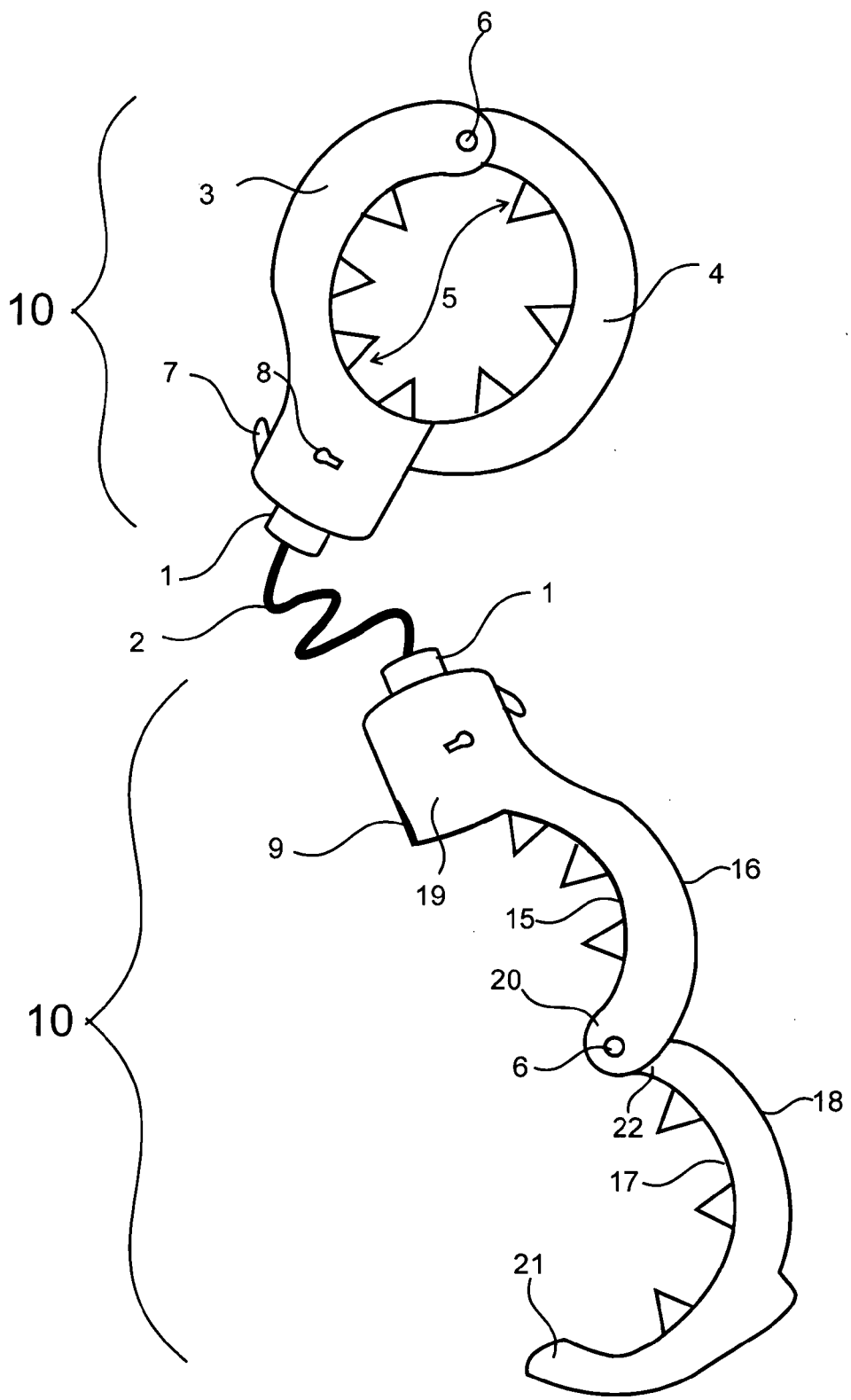
FIG. 1 shows one embodiment of the present invention wherein one of the locking rings is in a closed position and the other locking ring is in an open position.

FIG. 1 shows one embodiment of the present invention wherein one of the locking rings is in a closed position and the other locking ring is in an open position. Each locking ring 10 comprises a base 1, a stationary arcuate arm 3, and a moveable arcuate arm 4. The locking rings 10 are connected to each other by a cable 2 attached to the base 1 of each locking ring 10.

The stationary arm 3 has two ends, a pivot end 20 and a locking end 19. Attached to stationary arm 3 is the moveable arm 4, also having a pivot end 22 and a locking end 21. The moveable arm pivot end 22 is attached to the stationary arm pivot end 20 at a pivot point 6. On the stationary arm inner surface 15 and the moveable arm inner surface 17 are a plurality of spikes 5.

The moveable arm 4 rotates around the pivot point 6 and can pivot into an open position or a closed position. While in the closed position, the moveable arm locking end 21 is inserted into an opening 9 in the stationary arm locking end 19. By "closing" the ring it is meant that the locking ends of the moveable arm 4 and the stationary arm 3 are moved toward each other, forming a closed ring. By "opening" it is meant that the locking end 21 of the moveable arm 4 is moved away from the locking end 19 of the stationary arm 3. After the ring is closed, the moveable arm locking end 21 can continue to rotate around pivot point 6 so that the locking end 21 is inserted deeper into opening 9, thereby decreasing the size of the ring.

Within the stationary arm locking end 19 is a pawl-and-ratchet mechanism comprising a pawl (not shown). Such mechanisms are well known in the art. When the moveable arm locking end 21 is inserted into the opening 9, the pawl engages the outer surface 18 of the moveable arm locking end 21, allowing further movement of the moveable arm 4 into opening 9 but preventing the moveable arm 4 from being retracted from opening 9. In one embodiment of the present invention, the moveable arm locking end 21 has a plurality of ratchet teeth 25 along the outer surface 18, wherein the edge of each ratchet tooth closest toward the locking end 21 is slanted and the edge of each ratchet tooth closest toward the pivot end 22 is a straight edge. When the moveable arm 4 is inserted into opening 9, the pawl engages the ratchet teeth 25 allowing further movement of the moveable arm 4 only into the opening 9.

The stationary arm locking end 19 contains a release lever 7. The release lever 7 is connected to the pawl. When the release lever is depressed, the pawl is disengaged from the moveable arm 4, allowing the moveable arm 4 to retract from the opening 9.

In the embodiment illustrated in FIG. 1, a locking mechanism is connected to the release lever. The locking mechanism comprises a keyhole 8, whereby insertion of a key and rotation in one direction prevents the release lever 7 from disengaging the pawl from the moveable arm 4. This is the locked position. Rotating the key in the opposite direction returns the locking mechanism back to a position which does not interfere with movement of the release lever 7 to disengage the pawl.

Figure 2A:
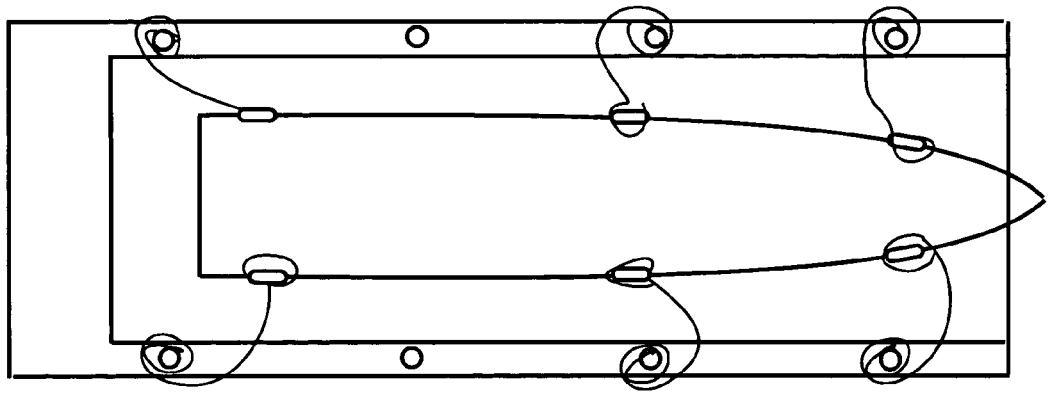
FIG. 2A shows a boat conventionally tied to a dock with several mooring lines.
Figure 2B:
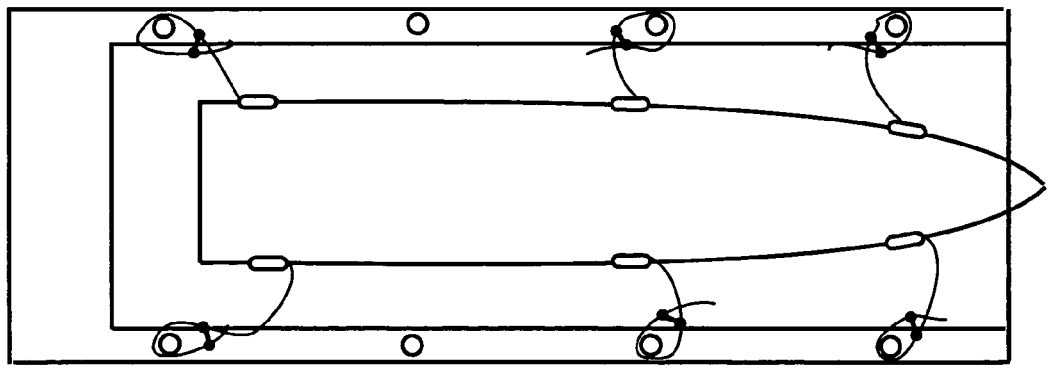
FIG. 2B shows a boat secured to dock as in FIG. 2A where the knots are replaced with the rope-fastening device of the present invention.

When docking a boat conventionally, mooring lines are tied to cleats on the boat as shown in FIG. 2A. The other ends of the mooring lines are secured to mooring posts. Instead of wrapping the mooring line several times around the mooring post and tying a complicated knot, a device of the present invention is used as shown in FIG. 2B.

Figure 3:
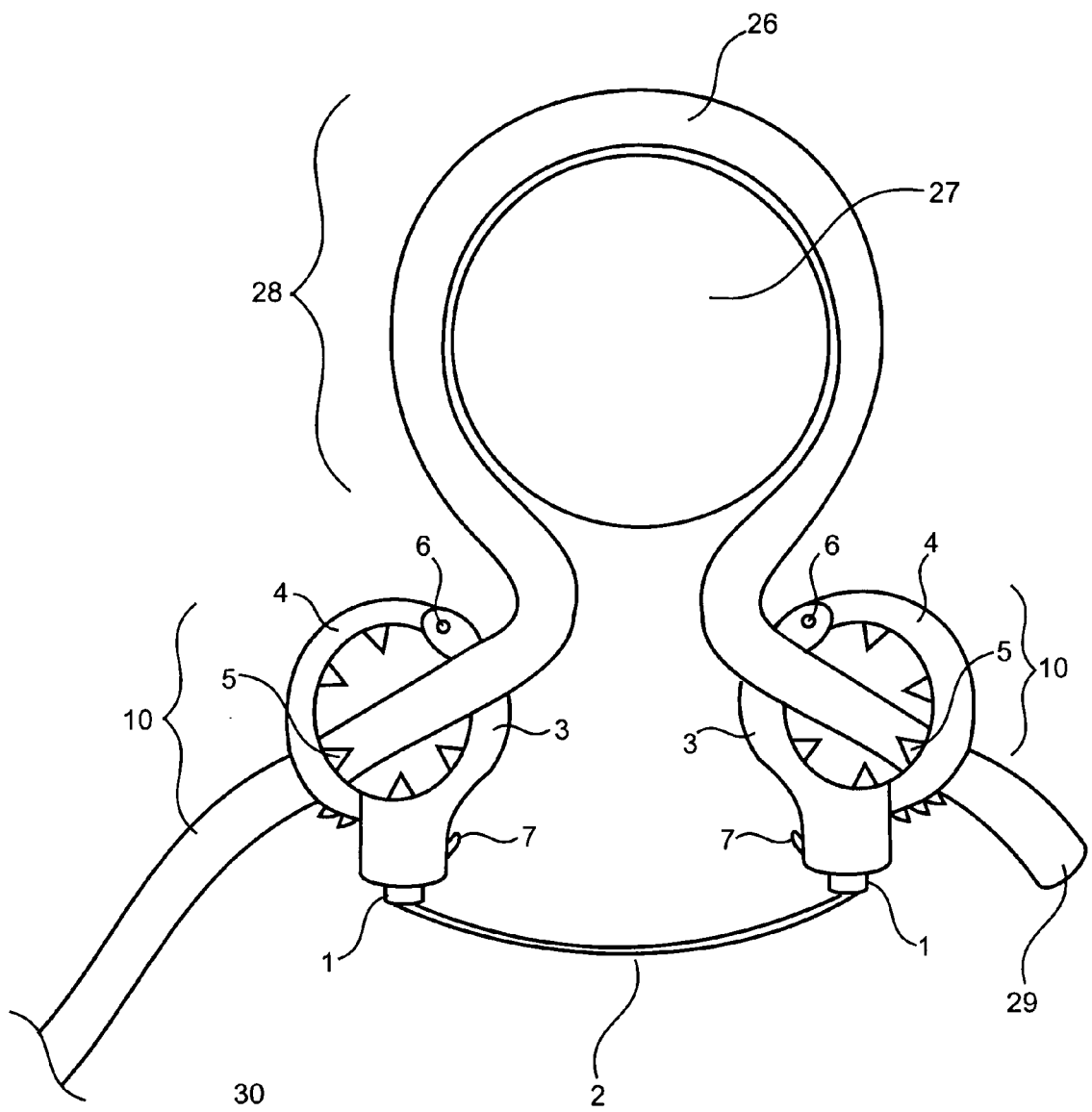
FIG. 3 shows the rope-fastening device of this invention used to form and secure a rope loop around a mooring post.

As shown in FIG. 3, in an embodiment of the present invention one of locking rings 10 is closed around the free end 29 of a mooring line 26, and the moveable arm 4 is rotated toward the stationary arm locking end 19 until the spikes 5 along the stationary arm inner surface 15 (and the moveable arm inner surface 17) press tightly into the mooring line 26. If the locking ring 10 is closed tightly enough around the mooring line, the mooring line will not slip through the locking device. The mooring line 26 is wrapped around the mooring post 27 and the other locking ring 10 is closed, in the same fashion as described above, around the standing part 30 of mooring line 26, forming a loop 28 around mooring post 27.

The size of loop 28 can be adjusted by releasing one or both of the locking rings 10, moving the position of the locking rings 10 along the mooring line 26 and re-closing the locking rings 10 on the mooring line 26.

When leaving the dock, the locking rings 10 are quickly released from the mooring line by pressing the lever 7 (FIG. 1), which allows the moveable arm 4 to disengage from the stationary arm locking end 19. Optionally, the locking mechanism can be locked to prevent unwanted release of the locking rings, and then unlocked to release the locking rings.

While the invention has been described with certain preferred embodiments, it is understood that the preceding description is not intended to limit the scope of the invention. It will be appreciated by one skilled in the art that various equivalents and modifications can be made to the invention shown in the specific embodiments without departing from the spirit and scope of the invention. All publications referred to herein are incorporated herein to the extent not inconsistent herewith.

I claim:

1. A rope-fastening device comprising:
   (a) a first and a second locking ring, each locking ring comprising:
      a base;
      a stationary arcuate arm extending from said base, said stationary arcuate arm having a locking end and a pivot end;
      a moveable arcuate arm having a locking end and a pivot end connected to the pivot end of said stationary arm at a pivot point;
      an opening in the locking end of said stationary arm suitable for receiving the locking end of the moveable arm; and
      a plurality of gripping members along the inner surface of said moveable arm or said stationary arm; and
   (b) a flexible connector linking the base of said first locking ring with the base of said second locking ring.

2. The device of claim 1 comprising a pawl-and-ratchet mechanism comprising a pawl disposed at the locking end of said stationary arm adapted to engage the locking end of said moveable arm when said moveable arm is inserted into the locking end of said stationary arm.

3. The device of claim 2 comprising a release lever connected to said pawl, wherein pressing said release lever disengages said pawl from the locking end of said moveable arm.

4. The device of claim 3 comprising a locking mechanism operably connected to said release lever, wherein locking said locking mechanism prevents said release lever from disengaging said pawl from the locking end of said movable arm.

5. The device of claim 2 comprising a key release mechanism connected to said pawl comprising a key and keyhole, wherein rotating said key in said keyhole disengages said pawl from the locking end of said moveable arm.

6. The device of claim 2 comprising a plurality of ratchet teeth along the outer surface of the locking end of said moveable arm.

7. The device of claim 2 comprising a plurality of ratchet slots along the outer surface of the locking end of said moveable arm.

8. The device of claim 2 comprising at least one locking ring closed around a mooring line, wherein the size of said locking ring is adjustable by moving the locking end of said moveable arm deeper into said opening of the locking end of said stationary arm.

9. The device of claim 8 wherein said pawl-and-ratchet mechanism permits movement of said moveable arm into said opening but prevents said moveable arm from being retracted from said opening.

10. The device of claim 1 wherein said gripping members comprise a plurality of teeth or spikes.

11. The device of claim 1 wherein said locking rings are constructed from metal.

12. The device of claim 1 wherein said locking rings are constructed from metal and said flexible connector is constructed from a material having tensile strength equal to or greater than rope.

13. A mooring system for docking a watercraft comprising one or more mooring lines and the device of claim 1 suitable for tightly closing around said mooring lines.

14. The mooring system of claim 13 wherein said one or more mooring lines have diameters ranging from about ¼ of an inch to about 2 inches.

15. A boat comprising at least one cleat, at least one mooring line attached to said cleat, and the device of claim 1 suitable for tightly closing around said mooring line.

16. A method of docking a watercraft using the device of claim 1 comprising the steps:
   securing the first end of a mooring line to a watercraft;
   wrapping the docking end of said mooring line around a docking object;
   tightly closing the first locking ring around the free end of said mooring line; and
   tightly closing the second locking ring around the standard part of said mooring line.

17. The method of claim 12 further comprising releasing the watercraft from the docking object by releasing a locking ring from said mooring line and un-wrapping said mooring line from around said docking object.

* * * * *